US012663884B2

(12) United States Patent
Grosjean et al.

(10) Patent No.: US 12,663,884 B2
(45) Date of Patent: Jun. 23, 2026

(54) METHOD AND SYSTEM FOR DYNAMIC ILLUMINATION CORRECTION FROM BIT-REDUCED DATA FOR COMPUTER MOUSE APPLICATIONS

(71) Applicant: EM Microelectronic-Marin SA, Marin (CH)

(72) Inventors: Sylvain Grosjean, Les Fins (FR); Evan Lojewski, Woodland Park, CO (US); Brian Moore, Colorado Springs, CO (US); Jérémy Schlachter, Villars-le-Grand (CH); Lorenzo Pierobon, Neuchâtel (CH)

(73) Assignee: EM Microelectronic-Marin SA, Marin (CH)

( * ) Notice: Subject to any disclaimer, the term of this patent is extended or adjusted under 35 U.S.C. 154(b) by 383 days.

(21) Appl. No.: 18/354,707

(22) Filed: Jul. 19, 2023

(65) Prior Publication Data

US 2024/0045522 A1 Feb. 8, 2024

(30) Foreign Application Priority Data

Aug. 5, 2022 (EP) .................................... 22189076

(51) Int. Cl.
G06F 3/038 (2013.01)
G06F 3/03 (2006.01)
G06F 3/0354 (2013.01)

(52) U.S. Cl.
CPC ............ G06F 3/038 (2013.01); G06F 3/0304 (2013.01); G06F 3/03543 (2013.01)

(58) Field of Classification Search
CPC ...................................................... G06F 3/038
See application file for complete search history.

(56) References Cited

U.S. PATENT DOCUMENTS

| | | | | |
|---|---|---|---|---|
| 8,237,835 | B1 * | 8/2012 | Muller | A61B 3/1025 |
| | | | | 382/128 |
| 8,620,102 | B2 * | 12/2013 | Hunter | G06T 5/80 |
| | | | | 382/274 |
| 12,158,994 | B1 * | 12/2024 | Lye | G06F 3/0317 |
| 2005/0253812 | A1 * | 11/2005 | Lin | G06F 3/0317 |
| | | | | 345/163 |

(Continued)

OTHER PUBLICATIONS

European Search Report for EP 22 18 9076, dated Jan. 13, 2023.

*Primary Examiner* — Chun-Nan Lin
(74) *Attorney, Agent, or Firm* — Sughrue Mion, PLLC

(57) ABSTRACT

A method for applying illumination correction for an optical computer mouse, includes: flashing a light source of the mouse directed towards a surface; accumulating voltage on a pixel array of the mouse to obtain raw pixel values of an image frame in response to detecting light reflected from the surface; applying analog correction to the raw pixel values based on digital gain coefficients to obtain an array of corrected pixel values forming corrected image data; digitizing the corrected image data with an analog-to-digital converter to obtain digital pixel values forming digital image data; and updating the digital gain coefficients so that a gain coefficient corresponding to a digital pixel value is incremented if the digital pixel value is below or equal to a given pixel threshold value, and so that the gain coefficient is decremented if the digital pixel value is above the given pixel threshold value.

13 Claims, 4 Drawing Sheets

(56)    References Cited

U.S. PATENT DOCUMENTS

| | | | |
|---|---|---|---|
| 2006/0022116 A1* | 2/2006 | Wang | G06F 3/0317 |
| | | | 250/208.1 |
| 2006/0023970 A1* | 2/2006 | Wang | G06F 3/0317 |
| | | | 382/312 |
| 2011/0298943 A1* | 12/2011 | Hunter | G06T 5/80 |
| | | | 348/222.1 |
| 2013/0329962 A1* | 12/2013 | Kao | G06F 3/03543 |
| | | | 382/106 |
| 2015/0015491 A1* | 1/2015 | Lee | G06F 3/0346 |
| | | | 345/166 |
| 2015/0338931 A1* | 11/2015 | Teh | G06F 3/0354 |
| | | | 345/166 |
| 2018/0232065 A1* | 8/2018 | Gu | G06F 3/03543 |

* cited by examiner

METHOD AND SYSTEM FOR DYNAMIC ILLUMINATION CORRECTION FROM BIT-REDUCED DATA FOR COMPUTER MOUSE APPLICATIONS

CROSS REFERENCE TO RELATED APPLICATIONS

This application claims priority to European Patent Application No. 22189076.7 filed Aug. 5, 2022, the entire contents of which are incorporated herein by reference.

TECHNICAL FIELD

The present invention relates to a method for applying an illumination correction for an optical computer mouse. More specifically, the present invention relates to a feedback method to produce and apply an accurate analog correction of an illumination profile of the mouse using bit-reduced image data. The invention also relates to an optical computer mouse configured to carry out the method.

BACKGROUND OF THE INVENTION

An optical mouse is a computer mouse which uses a light source, typically a light-emitting diode (LED), and a light detector, such as an array of photodiodes, to detect movement of the mouse relative to a surface. Variations of the optical mouse have largely replaced older mechanical mice, which rely on moving parts to sense motion.

In operation, the optical mouse takes a picture of the surface it sits upon, and then after moving slightly, it takes another picture. The two pictures or images, also referred to as image frames, should overlap, and the images are compared to determine what offset is needed to align the common surface patterns in both image frames. Thus, the mouse determines its motion through displacement measured by aligning overlapping image frames on an array of pixels. The offset is reported to the host computer as the measured movement. The mouse moves again, takes a new picture, compares it to the previous picture, and another displacement report is generated. This repeats hundreds or thousands of times per second and the motion between image frames is measured in tens of micrometers.

An optical computer mouse utilizes a controlled light source to generate the illumination necessary for collecting surface images. This light source will generally produce a non-uniform illumination profile visible to the pixel array collecting the images. Light source, lens shape and distortion, varying pixel sensitivity, scratches, dust, or debris within the optical path, and other factors may all contribute to a non-uniform illumination seen by the pixel array.

Optical mice operate by calculating the displacement of common surface features between collected images to determine the motion of the mouse. A non-uniform illumination profile can produce detrimental effects for this form of tracking in two primary ways. Firstly, the widespread illumination profile will appear to be static between images despite motion, suggesting zero motion seen between frames. Secondly, the features themselves will vary in quantitative appearance as they move from one part of the array to another, which may interfere with the ability to identify and align common features between images and distort the estimated displacement.

It is therefore beneficial to provide some form of calibration and/or filtering to correct the collected images in order to negate the influence of any nonuniformities in the illumination seen across the array.

Under the assumption that images collected while moving will possess random, uncorrelated features with a zero-mean distribution relative to the average surface illumination, a standard method for calculating the illumination profile is to calculate the mean or median of each pixel value collected across many unprocessed, uncorrected image frames. This will closely approximate the illumination profile, given a sufficient number of samples, and the values calculated for each array element can be used to scale each pixel's digital value to a 'corrected' value to negate the impact of the illumination profile.

A standard form of this method—termed here as the 'direct method'—involves initiating a flash, collecting the image with the pixel array, digitizing the analog voltages collected by the pixel array, and storing and processing the digital data across multiple frames to produce the necessary corrections. By aggregating multiple images, the changing surface profile will average out while the static illumination profile will compound, producing a good approximation of the illumination profile. In this way, the gain coefficients necessary to correct for the illumination profile are calculated directly from raw data all at once.

FIG. 1 shows a first example surface profile 1 taken for image 1, and a second example surface profile 1 taken for image 2, an example illumination profile 3, a first raw data pixel image 5, and a second raw data pixel image 5. The first and second raw data pixel images 5 are obtained by multiplying the first and second surface profiles with the illumination profile 3. In this specific example, the surface features are shifted 30 pixels between images 1 and 2. A first type of dashed circles 7 illustrate static features, such as dust, while a second type of dashed circles 9 illustrate weaker features which can disappear in areas of low illumination. Static features self-correlate in opposition to shifted features.

Once the gain coefficients have been calculated, newly sampled images can have their illumination profile corrected out by multiplying each pixel value by an inverse value corresponding to the pixel's individual average illumination. This processed frame data is then compared with previous corrected frames to produce the displacement measurement, and then stored for use in future comparisons with future processed images. Because the illumination profile can change with surface conditions or random events such as the accumulation of dust in the optical path, it can be necessary to frequently update the illumination profile estimate by repeating the calculation process.

The order of events for the image data is important for making an accurate displacement comparison. The direct method's characterization of the illumination profile requires a digital representation of the raw image data. Consequently, the image data collected by the pixel array must immediately be digitized by an analog-to-digital converter (ADC) of sufficient bit-depth, and no analog corrections or processing may be performed. This leads to digital calculations, which can be expensive, requiring some combination of power, memory, processing power, and dedicated hardware to perform these digital calculations in the limited time before the next image is collected. A high-bit-depth estimation of the illumination profile is often necessary to sufficiently correct the distortion, but it is desirable to calculate and implement that correction without the use of a larger ADC, solved by the present invention.

The document US 2013/329962 A1 discloses a displacement detection device includes a light source, an image sensor and a processing unit. The light source is configured to illuminate a work surface. The image sensor is configured to capture reflected light from the work surface and to output an image frame. The processing unit is configured to select a window of interest in the image frame having a maximum image feature and to calculate a displacement of the displacement detection device according to the window of interest.

The document US 2005/253812 A1 discloses an optical mouse, with shade compensation, has a light source, a sensor and a controller. The light source illuminates a sampling plane of a mouse. The sensor consists of a 2-dimensional array of sensing elements to capture an image from the sampling plane and temporarily store the image into a 2-dimensional array of pixels, each having a pixel value. The controller is connected to the sensor for adjusting the pixel values according to a predetermined table, thereby achieving a shade compensation for the sensing elements.

SUMMARY OF THE INVENTION

An object of the present invention is to overcome at least some of the above shortcomings relating to illumination profile corrections, for instance in the context of optical mouse tracking.

According to a first aspect of the invention, there is provided a method for dynamically applying an illumination correction for an optical computer mouse as recited in claim 1.

The present invention thus proposes an alternate method of characterizing the illumination profile—termed here as the 'feedback method'—which calculates the illumination profile in an iterative manner by shifting the gain coefficients based on post-corrected and potentially post-processed image data digitized with arbitrarily low resolution.

Because the feedback method does not need access to the raw image data, the data does not need to be digitized until after the raw image data is corrected. Some forms of additional processing which does not interfere with the feedback method can also be performed in the analog domain prior to digitization. The ability to perform the correction and processing steps in the analog domain can offer significant reductions in power, hardware, and processing requirements, compared with performing these same operations in the digital domain.

Furthermore, the ability for the feedback method to work on arbitrarily low-resolution digital data means that an ADC with as little as 1 bit may be used, and the digital image data used and stored for displacement comparisons can be of arbitrarily low resolution. This can greatly reduce the memory and digital processing requirements necessary for the displacement comparison calculations.

According to a second aspect of the invention, there is provided an optical computer mouse configured to carry out the method according to the first aspect of the present invention.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF THE INVENTION

Figure 1:
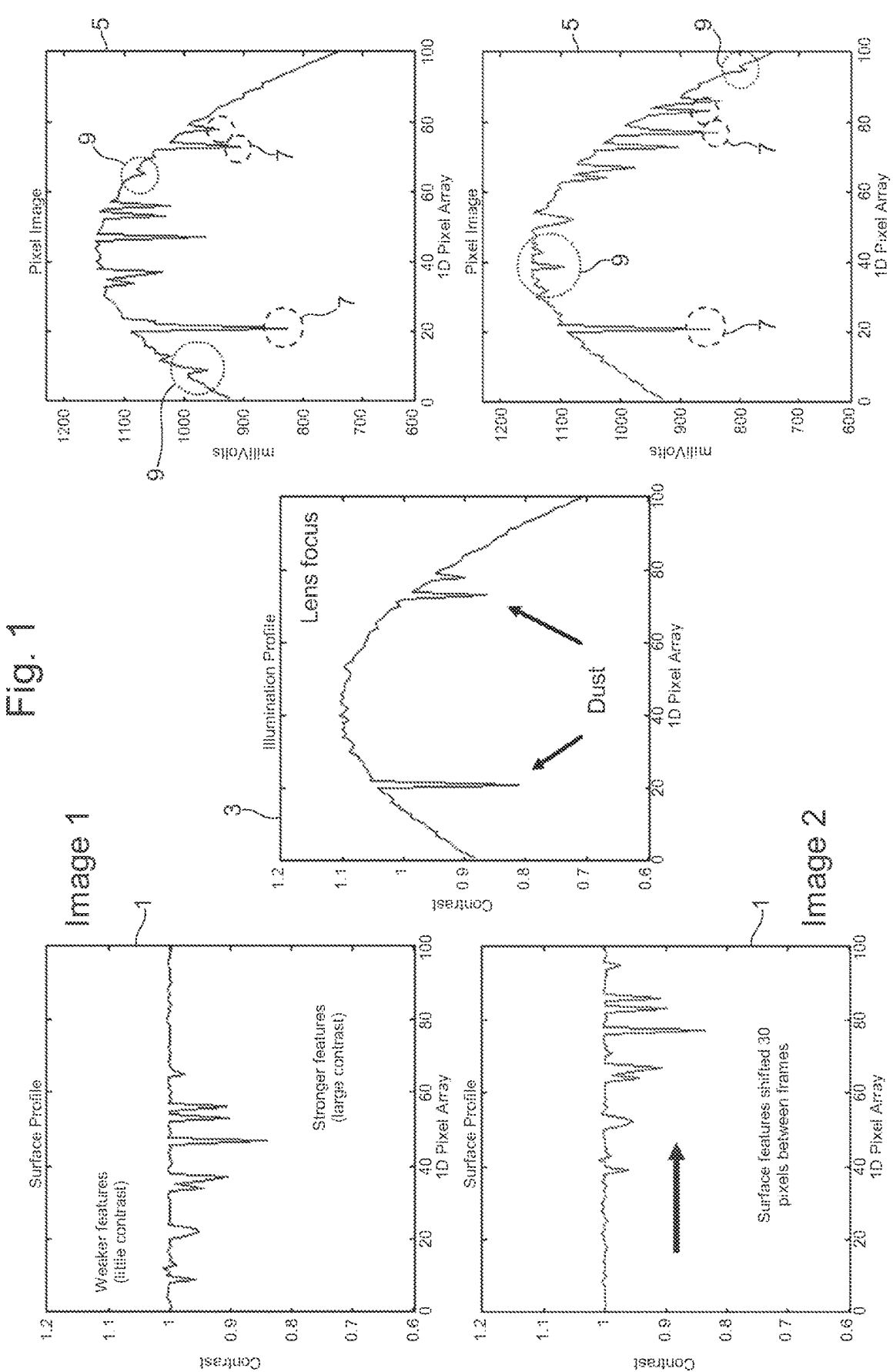
FIG. 1 shows first and second example surface profiles, an example illumination profile, and first and second raw data pixel images obtained by multiplying the first and second surface profiled with the illumination profile.

An embodiment of the present invention will now be described in detail with reference to the attached figures. Identical or corresponding functional and structural elements which appear in different drawings are assigned the same reference numerals. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend".

Before explaining the teachings of the present invention in more detail, some definitions relating to the present invention are first given in the following.

Direct method is a standard reference method which calculates the illumination profile correction in the digital domain directly from one or more uncorrected images digitized at a sufficiently high resolution.

Feedback method is the proposed invention, which calculates the illumination profile correction from corrected data digitized at an arbitrarily low resolution. The absence of the requirement for the digitization of raw image data permits the correction of the illumination profile, as well as some additional forms of processing, to be performed in the analog domain prior to digitization.

An illumination profile refers to the array of relative voltage values collected by the pixel array in the absence of any surface features. The illumination profile is scaled to have an average value of 1, with individual values greater or less than 1 indicating greater or lesser amounts of light accumulated by individual pixels relative to the average of the array. The illumination profile represents the non-uniform illumination seen by the pixel array as a consequence of the characteristics of the light source, lenses, average surface characteristics, and the shape of the optical path, as well as any dust, debris, or scratches present in the optical path, any pixel sensitivity variation, and any other factors that influence the light seen by each pixel. A non-uniform illumination profile is considered detrimental to tracking.

A surface profile refers to the array of pixel values corresponding to the distribution of surface features in an image collected under the conditions of a uniform illumination profile.

Surface features are any area of the tracking surface which reflects an amount of light different than the average of the surface into the corresponding pixel. This includes areas of different color or reflectivity, as well as physically non-flat areas which reflect incoming light away from the pixel it falls under. It is more common for a surface feature to reduce incoming light than to increase it, though both are possible. For this reason, it is common when digitizing the analog value, lower analog values are assigned larger digital values, indicating more significant features from a greater reduction in light seen by a given pixel.

A pixel array is the collection of pixels on the photoreceptor which accumulates voltages on each individual pixel while exposed to light in proportion to the light received.

A pixel is a photo-sensitive [square] area which records a single analog or digital voltage based on light collected during a period of time.

Gain coefficients refer to the individual amount that each pixel is scaled by to correct for the illumination profile. An ideal gain coefficient will be the inverse of the value of the illumination profile for a given pixel. This is a digital value in both methods, though it is used in a digital calculation in the direct method, and is used to control an analog circuit in the feedback method.

A gain array is the array of digital gain coefficients used to correct raw image data. This array of coefficients should correspond to the inverse of the illumination profile once properly estimated.

An analog-to-digital converter (ADC) is a standard piece of hardware which in the example below will convert ranges of voltage values into digital values. An ADC is limited by how many bits it can use to represent the range of collected data. The number of states necessary to adequately represent the values being recorded is equal to the range of voltages to be sampled divided by the desired resolution. The number of bits required to digitize this data is equal to the log 2 of the number of states, rounded up. Reducing the number of bits requires a reduction in the range or resolution of the data being digitized.

An image (or an image frame) is the collection of pixel values that resulted from a single flash of the light source. These values can be in an analog or digital form, as voltages or digital values, and can be in a raw, corrected, filtered, or processed state in either form.

Raw image data refers to image data which contains both the surface profile and illumination profile, and has had no correction or processing performed.

Corrected image data refers to image data which has been corrected to remove the illumination profile based on some known estimate of the illumination profile.

Processed image data refers to image data which has been processed in some way to improve the ability to match and track the movement of common features present in both the current image and previously collected images. Processing is generally done to emphasize or isolate aspects of the surface profile, and often cannot be done while the illumination profile is still present in the image.

Displacement comparison is a comparison performed between the current image and data from one or more overlapping images stored in memory to identify the displacement of common features in order to determine the motion of the mouse.

A host (or host computer) is the computer or other device the peripheral mouse is plugged into. The host is presumed to expect differential measurements, i.e., the displacement between the mouse's current position and its position at the time of its previous report. The host will add this reported measurement directly to a mouse pointer position to produce a new position. The pointer position of the host should, at any given time, be at its initial location plus the cumulative sum of all displacement reports sent by the mouse. This value may be scaled by an arbitrary value, and this ignores the impact of the pointer pressing against any screen boundaries.

Displacement is the distance moved between two images being compared.

A displacement report is the final measurement reported to the host computer, measured in pixels, between two compared images.

Figure 2:
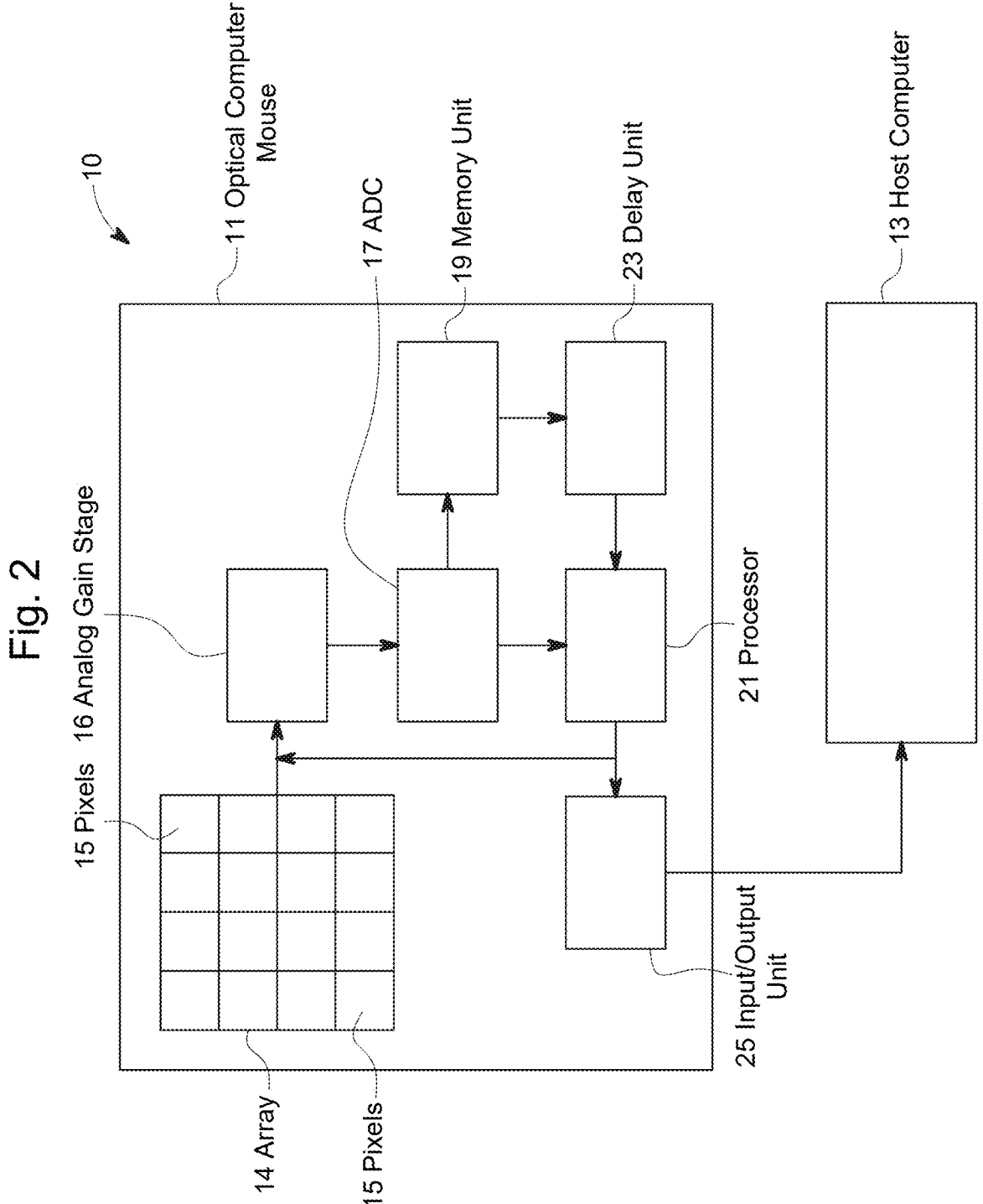
FIG. 2 is a block diagram illustrating some functional elements of an optical computer mouse together with a host computer.

The present invention is next explained in more detail with reference to the figures. FIG. 2 shows a simplified block diagram of a processing system 10 configured to implement the method of the present invention. The system comprises an optical computer mouse 11 which is operatively connected to a host computer 13. The connection may be a wired connection or a wireless connection depending on the implementation. Different connection examples that may be used are PS/2, universal serial bus (USB) or Bluetooth. The mouse 11 comprises an image sensor having an array 14 of photosensitive pixels 15, which is operatively connected to an analog gain stage 16 configured to pixelwise multiply pixels of a raw data pixel array with gain coefficients of a gain array. The analog gain stage 16 is operatively connected to an ADC 17, which is configured to digitalize corrected images received from the analog gain stage 16. The ADC is operatively connected to a memory unit 19 configured to store the digitalized images received from the ADC 17. The ADC is further operatively connected to a processor 21, which is for example configured to carry out the illumination profile adjustment process in a negative increment feedback loop as will be explained later in more details. A delay unit 23 is arranged between the processor 21 and the memory 19. More specifically, in this example, the delay unit is a 1-sample delay unit configured to feed image frame N−1 to the processor, while the ADC 17 is configured to feed frame N to the processor, where frame N is the current or most recent image frame, while frame N−1 is the immediately previous image frame to frame N. The processor 21 is further configured to send a displacement report to an input/output unit 25, which operates as an interface between the mouse 10 and the host computer 13.

Optical mice work by tracking the motion of surface features as they move across subsequent images to calculate the motion of the mouse between the collected frames. Surface features generally constitute any part of the surface which reflects either more or less light than the average of the surface. This is a multiplicative effect, where a section of the surface will reflect some percentage of the light which hits it. The percentage of light that gets absorbed or deflected away from the pixel by the feature is termed the 'contrast' of the feature. For example, if a section of a surface reflected only 96% of the average light back to the pixel array, it would have a contrast of 4%. If the illumination seen by each individual pixel varies, then that range of illumination values compounds with the range of surface feature contrasts to produce an overall range of analog voltages recorded in an image.

For a given application, the size of the ADC and the size of the digital data it produces are determined by the range and resolution of the analog voltages that are to be captured. For example, while tracking on a surface with features that range from −5% to +20% contrast, while illuminating the surface with a uniform 1024 mV average voltage accumulated per pixel per flash, the expected range of values collected by the pixel array would range from 1075 mV to 819 mV, which is a range of 256 mV. If a resolution of 4 mV is desired, then an ADC with at least 5 bits of resolution is necessary in order to map all possible values from the analog domain to a digital representation.

If the illumination profile is not uniform, the necessary bit depth may increase. For example, if the illumination profile is roughly parabolic, so that the illumination seen towards the center of the array is 120% of the 1024 mV average, and the illumination seen in the corners of the array is only 60% of the 1024 mV average, then the range of analog voltages collected in a single image increase significantly. The highest possible voltage recorded would be 1024 mV×1.20× 1.05=1290 mV. The lowest possible voltage recorded would be 1024 mV×0.60×0.80=492 mV. This is a range of 798 mV. If the desired resolution of 4 mV per least significant bit (LSB) is to be maintained, then a minimum of 8 bits would be necessary to accurately digitize the data.

An ADC with a greater number of bits requires a greater amount of hardware, and it generates digital data with a greater number of bits which must be transferred, processed, and stored while performing digital operations. This requires an increase in power, hardware, processing, and memory with the increase of bit depth.

When using the direct method, the information regarding the illumination profile must reach the digital domain in order to be used to calculate a correction, so an ADC of sufficient size to capture the dynamic range of the surface profile and illumination profile combined is necessary—in this example an ADC of at least 8 bits.

With the proposed feedback method, by performing the illumination correction in the analog domain prior to digitization, the necessary bit depth for the ADC and subsequent digital data may be kept to an amount only necessary for covering the dynamic range of the surface profile. For the purposes of characterizing the illumination profile, the ADC could have as little as a single bit. For the purposes of tracking surface features, an ADC of 5 bits limited to the range of the surface profile would be sufficient to match the quality of the direct method utilizing the 8-bit ADC, as the digitized data used will be of similar quality and resolution once the gain corrections are applied in each method.

In the direct method, the illumination correction is calculated in some manner from several digitized, uncorrected images. Once the illumination profile is characterized as an array of gain coefficients, the digital value of each coefficient for each pixel must be used to correct each pixel of each new image. This will require at least one multiplication or division operation per pixel, which will number in the hundreds or thousands, which must be performed on each new image. After this correction is made, additional processing of the corrected data prior to performing a comparison with previously collected image frames may be desired.

These digital calculations can be expensive, requiring some combination of power, memory, processing power, and dedicated hardware to perform these digital calculations in the limited time before the next image is collected.

Correcting for the illumination profile in the digital domain imposes some hardware requirements. The hardware must contain an ADC of sufficient bit-depth to capture the full range of voltage values arising from the product of the surface profile and illumination profile, which will always be equal to or larger than the surface profile with a uniform illumination. Calculating an estimate of the illumination profile and keeping it up to date can require a non-trivial amount of memory and processing. Performing the correction once an estimate of the illumination profile is calculated can require many hundreds or thousands of digital multiplications for each image frame, as each individual pixel must be scaled by the gain coefficients that correspond to the inverse of the illumination profile. These steps can be expensive in terms of hardware, power, and processing time.

The proposed feedback method operates on the digitized representation of corrected data. Therefore, the correction for the illumination profile can be moved to the analog domain. Performing voltage division or multiplication in the analog domain can require a significantly reduced amount of power, dedicated hardware, and time, compared with digital divisions. Some forms of additional processing which do not interfere with the identification of the illumination profile by the feedback method can also be performed in the analog domain after the gain-correction stage and prior to digitization by the ADC.

With this altered structure, the correction and processing of raw image data can be performed more efficiently in ways not available when employing the direct method. A modified direct method calculation could reasonably apply its calculated correction with an analog gain stage by enabling a bypass which would occasionally digitize a raw image without gain correction, and then reinstate the analog correction step with the updated gain coefficients for some number of following images. However, this would require collecting extra images which cannot be used for tracking, and this would still require the use of an ADC of sufficient bit depth and range to accurately characterize the illumination profile. Both of which still add to the hardware and power requirements beyond those necessary with the feedback method.

The feedback method operates by setting up a negative feedback loop between the corrected pixel voltage and a desired average voltage or any other suitable voltage threshold value. If properly implemented to be stable, each pixel will have its average voltage driven to the set point. If fed with uncorrelated image frames, such that the surface profile does not express any significant patterns over time for any individual pixel, only the static illumination profile will be canceled out by the gain coefficients being adjusted.

Figure 3:
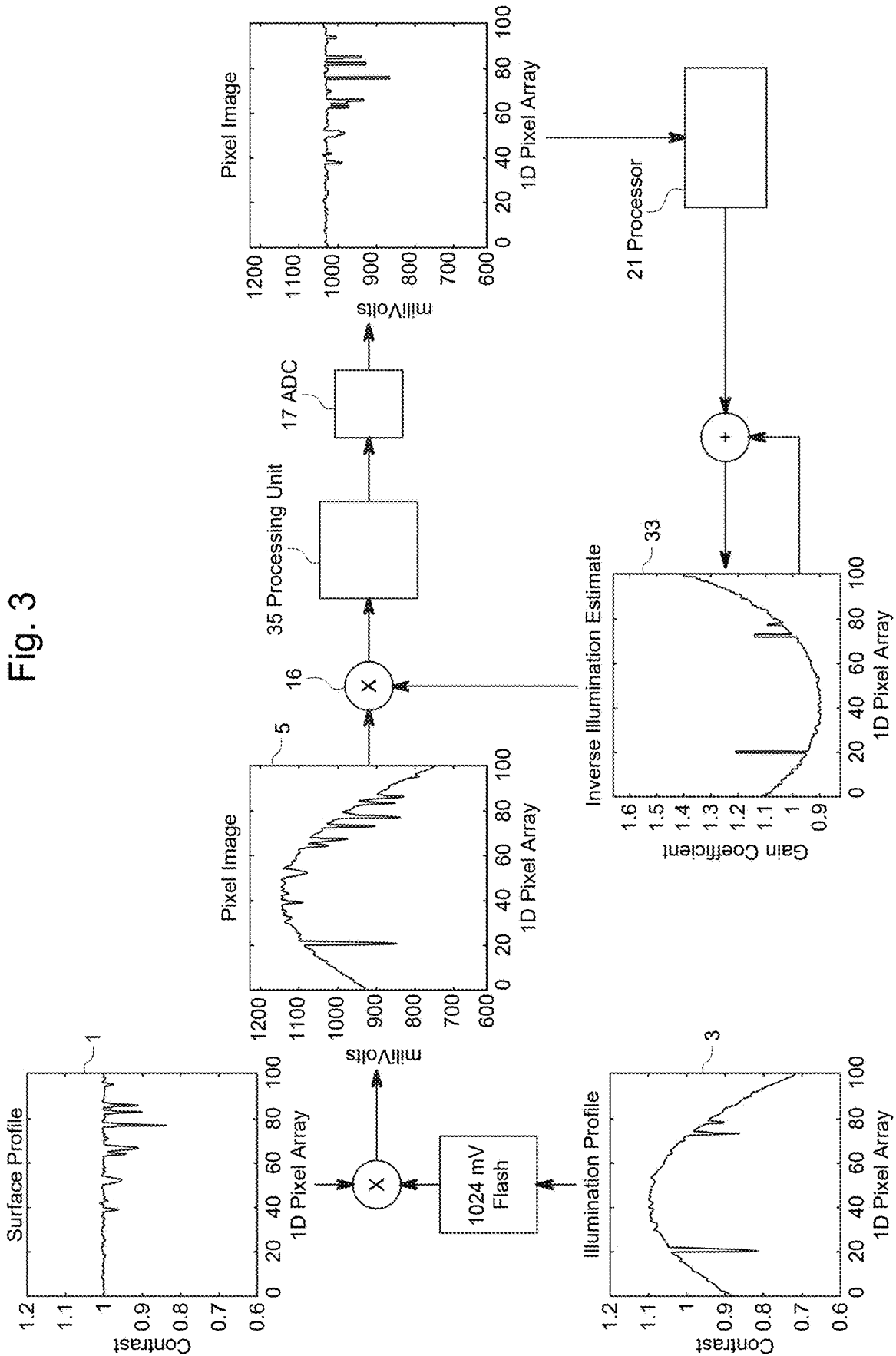
FIG. 3 schematically illustrates the process of dynamically applying an illumination correction for an optical computer mouse.

Referring to FIG. 3, an image 5, which is a raw data pixel array is collected as an array of pixel voltages by the pixel array 14. Those voltages are passed through the digitally controlled analog gain stage 16, which will amplify or attenuate each individual voltage by a specific coefficient, referred to as the gain coefficient. This analog gain stage has a range and resolution of gain coefficients sufficient to cancel out the illumination profile 3. These gain coefficients may be initialized to independent arbitrary values (to be used in the first iteration), but here they can be presumed to be initialized with uniform coefficients of 1.00 for simplicity. It is to be noted that 1-dimensional pixel arrays are shown in FIG. 3, but multidimensional pixel arrays could be used instead.

Once the voltages pass through the gain stage 16, the resulting 'corrected' analog data is digitized by the ADC 17 and the data, which forms a corrected digital image 31, is stored both for tracking and for refining the gain coefficients for the next image. The ADC must only be of sufficient range and resolution as needed for tracking the surface profile 1. Saturation of the ADC's range may occur with initial images with insufficiently corrected illumination profiles, but after a brief learning period, the illumination profile will be adequately filtered out.

Each digital value of the ADC 17 is assigned a gain adjustment weight, which specifies how much each pixel's digital gain setting is adjusted for the next image correction based on its corresponding pixel's value in the current image frame. The digital data 31 is converted by the weighting system into a gain coefficient update, and the digital gain settings for each pixel are appropriately adjusted. The newly updated gain coefficients, which collectively form a gain array 33 forming an inverse illumination profile estimate, will apply to the next image, improving the cancelation of the illumination profile 3 until each pixels' gain coefficients stabilize at or near the correct value necessary to negate the influence of nonuniform illumination. It is to be noted that an optional (non-linear) processing operation maintaining data monotonicity may be implemented in the analog domain by a processing unit 35 prior to carrying out the analog-to-digital conversion.

An example is given here of the gain adjustment of a single pixel. In this example, there is a pixel array which receives an average illumination of 1000 mV per flash. The flash is constant for every image collected. The individual pixel being observed is towards the center of the array where the light is more concentrated by the optical path, and initially measures a voltage of 1050 mV during the first image while over a featureless (0% contrast) area of the surface. The analog gain stage is in this example controlled by a 5-bit digital value for each pixel, with a range of gains from [0.92,1.075] with a resolution of 0.5% gain per LSB, or approximately 5 mV of adjustment per LSB on this surface. The gain setting is initialized to a value of 16 which produces a gain coefficient of 1.00. The range of the surface profile includes contrast features of 0% to 4%. Following the gain stage, corrected pixel voltages are digitized with a 4-bit ADC with a resolution of 8 mV per LSB and a range from [942 mV,1064 mV]. The weighting scheme chosen for the gain adjustment feedback is a weight of 0 for an ADC value of 7, corresponding to a voltage range of 992 mV to 1000 mV, a weight of +1 for values 0 to 6, covering the voltage range of 936 mV up to 992 mV, and a weight of −1 for values 8 to 15, covering the voltage range of 1000 mV to 1064 mV. There is system measurement noise present in the ADC following a zero-mean normal distribution with a standard deviation of 2 mV.

The tables below illustrate many calculated values across 20 frames, tracking the pixel's gain coefficient, corrected voltage, ADC measurement, and gain adjustment while subject to random measurement noise and surface contrasts, indicating no features (0%) or features of varying reflectivity (>0%). The calculations are as follows:

Gain Coefficient=1−(Gain−16)*0.005, Gain=[0,31]

Pixel Voltage=1050 mV*(1−Contrast)*GainCoefficient+PixelNoise $$ADC = \left\lceil \frac{PixelVoltage - 1000 \text{ mV}}{8} \right\rceil + 7, ADC = [0, 15]$$

$$GainAdjust = \begin{cases} +1, & ADC < 6 \\ 0, & ADC = 7 \\ -1, & ADC \geq 8 \end{cases}$$

Table 1 includes a model of the gain coefficient and measured voltage of this specific pixel as it traverses across the surface.

| Image | Contrast (%) | Pixel Noise (mV) | Gain/ Coeff | Pixel (mV) | ADC Value | Gain Adjust |
|---|---|---|---|---|---|---|
| 1 | 0 | +0.0 | 16/1.000 | 1050.0 | 14 | −1 |
| 2 | 3.3 | +0.5 | 15/0.995 | 1010.5 | 9 | −1 |

10

-continued

| Image | Contrast (%) | Pixel Noise (mV) | Gain/ Coeff | Pixel (mV) | ADC Value | Gain Adjust |
|---|---|---|---|---|---|---|
| 3 | 2.1 | −0.3 | 14/0.990 | 1017.8 | 10 | −1 |
| 4 | 0 | +2.5 | 13/0.985 | 1036.8 | 12 | −1 |
| 5 | 3.4 | +0.1 | 12/0.980 | 994.0 | 7 | +0 |
| 6 | 4.0 | +1.0 | 12/0.980 | 988.8 | 6 | +1 |
| 7 | 1.0 | +4.4 | 13/0.985 | 1037.5 | 12 | −1 |
| 8 | 3.6 | +1.8 | 12/0.980 | 993.7 | 7 | +0 |
| 9 | 2.0 | −1.1 | 12/0.980 | 1025.8 | 11 | −1 |
| 10 | 0 | +3.6 | 11/0.975 | 1027.4 | 11 | −1 |
| 11 | 0 | −1.3 | 10/0.970 | 1017.2 | 10 | −1 |
| 12 | 0 | +0.3 | 9/0.965 | 1013.5 | 9 | −1 |
| 13 | 0 | +1.1 | 8/0.960 | 1009.1 | 9 | −1 |
| 14 | 1.2 | −1.9 | 7/0.955 | 988.9 | 6 | +1 |
| 15 | 0 | −2.4 | 8/0.960 | 1005.6 | 8 | −1 |
| 16 | 3.9 | +0.7 | 7/0.955 | 964.7 | 3 | +1 |
| 17 | 0 | −1.9 | 8/0.960 | 1006.1 | 8 | −1 |
| 18 | 0 | +3.4 | 7/0.955 | 1006.1 | 8 | −1 |
| 19 | 0 | +0.7 | 6/0.950 | 998.2 | 7 | +0 |
| 20 | 0 | +0.3 | 6/0.950 | 997.8 | 7 | +0 |

In this example, the pixel initially receives an additional 50 mV or 5% more light than the pixel array average with a gain setting at an initial value of 16. This corresponds to a 100% gain coefficient or no adjustment, and with no surface contrast or analog noise. Ideally the pixel value under noiseless conditions with no surface features should be 1000 mV. This would be achieved with a gain coefficient of 95.24%.

Table 1 demonstrates that by adjusting the gain setting for this pixel according to a stable weighting method such as the one modeled here, the gain coefficient will converge to and stabilize around a value necessary to adjust the pixel to a value close to 1000 mV absent any surface features. The hypothetical convergence point will be slightly lower than 1000 mV, accounting for the average surface contrast seen across images, which will be some non-zero value between 0% and 4%, depending on the distribution. The dithering provided by the system noise and the changing surface contrasts as the mouse moves help the gain to converge on the desired value despite the gain resolution being smaller than the ADC resolution.

Table 2 tracks the same pixel subjected to the same noise and surface features, but with the ADC replaced by a single bit comparator with a threshold of 1000 mV, with voltages below 1000 mV returning a 0 and voltages above 1000 mV returning a 1. The weighting of the gain adjustment is altered to be +1 for an ADC value of 0, and −1 for an ADC value of 1.

$$ADC = PixelVoltage > ?\, 1000 \text{ mV}, ADC = [0, 1]$$

$$GainAdjust = \begin{cases} +1, & ADC = 0 \\ -1, & ADC = 1 \end{cases}$$

Table 2 includes a model of the gain coefficient and measured voltage of this specific pixel as it traverses across the same surface as in Table 1, but with a 1-bit ADC.

| Image | Contrast (%) | Pixel Noise (mV) | Gain/ Coeff | Pixel (mV) | ADC Value | Gain Adjust |
|---|---|---|---|---|---|---|
| 1 | 0 | +0.0 | 16/1.000 | 1050.0 | 1 | −1 |
| 2 | 3.3 | +0.5 | 15/0.995 | 1010.5 | 1 | −1 |

-continued

| Image | Contrast (%) | Pixel Noise (mV) | Gain/ Coeff | Pixel (mV) | ADC Value | Gain Adjust |
|---|---|---|---|---|---|---|
| 3 | 2.1 | −0.3 | 14/0.990 | 1017.8 | 1 | −1 |
| 4 | 0 | +2.5 | 13/0.985 | 1036.8 | 1 | −1 |
| 5 | 3.4 | +0.1 | 12/0.980 | 994.0 | 0 | +1 |
| 6 | 4.0 | +1.0 | 13/0.985 | 1003.9 | 1 | −1 |
| 7 | 1.0 | +4.4 | 12/0.980 | 1032.3 | 1 | −1 |
| 8 | 3.6 | +1.8 | 11/0.975 | 998.6 | 0 | +1 |
| 9 | 2.0 | −1.1 | 12/0.980 | 1025.8 | 1 | −1 |
| 10 | 0 | +3.6 | 11/0.975 | 1027.4 | 1 | −1 |
| 11 | 0 | −1.3 | 10/0.970 | 1017.2 | 1 | −1 |
| 12 | 0 | +0.3 | 9/0.965 | 1013.5 | 1 | −1 |
| 13 | 0 | +1.1 | 8/0.960 | 1009.1 | 1 | −1 |
| 14 | 1.2 | −1.9 | 7/0.955 | 988.9 | 0 | +1 |
| 15 | 0 | −2.4 | 8/0.960 | 1005.6 | 1 | −1 |
| 16 | 3.9 | +0.7 | 7/0.955 | 964.7 | 0 | +1 |
| 17 | 0 | −1.9 | 8/0.960 | 1006.1 | 1 | −1 |
| 18 | 0 | +3.4 | 7/0.955 | 1006.1 | 1 | −1 |
| 19 | 0 | +0.7 | 6/0.950 | 998.2 | 0 | −1 |
| 20 | 0 | +0.3 | 7/0.950 | 1003.1 | 1 | −1 |

In this second example, despite having the digital resolution reduced to a binary comparator, the gain coefficient still converges towards the ideal coefficient of 95.24%, though with a bit more variation due to the absence of a 0-weighted ADC value. This demonstrates that the ADC needs only have sufficient resolution for the desired quality of tracking the surface features. An appropriate gain correction for the illumination profile will be converged upon with an arbitrarily low bit-depth.

Figure 4:
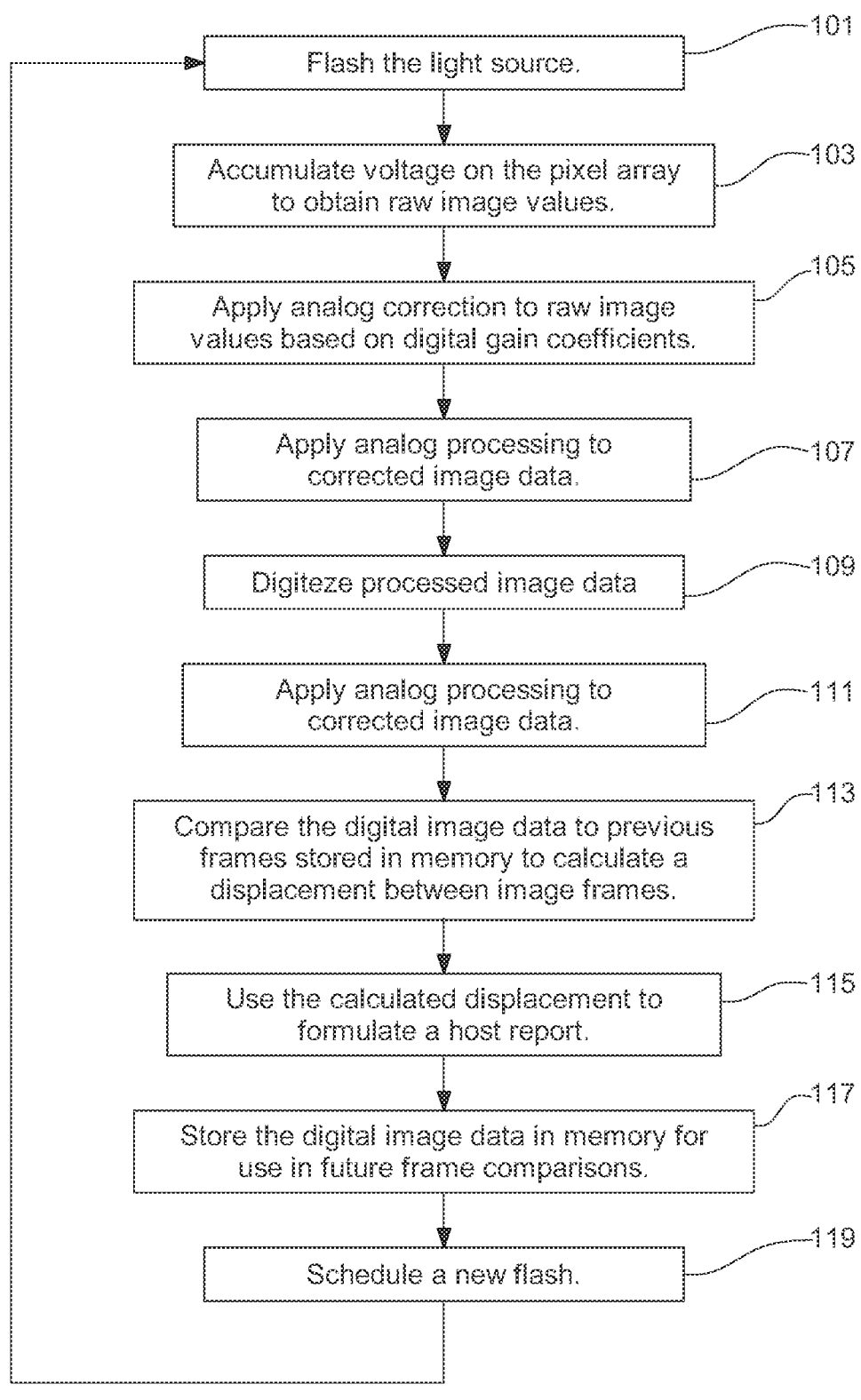
FIG. 4 is a flow chart summarizing the method steps of the process of dynamically applying an illumination correction for an optical computer mouse.

The flow chart of FIG. 4 summarizes the proposed feedback method. In step 101, the light source of the mouse 11 directed towards a surface is flashed. The surface is characterized with a given surface profile 1. In step 103, voltage on the pixel array 14 of the mouse 11 is accumulated to obtain raw pixel or image values of an image frame in response to detecting light reflected from the surface. The raw pixel values form a raw data pixel array 5. In step 105, a correction in the analog domain is applied to the raw pixel values by using digital gain coefficients to obtain an array of corrected pixel values forming corrected image data. Upon correcting the raw pixel values for the first time, some default values may be chosen for the digital gain coefficients. The default values may for instance form an array of constant values, which may for instance take the values of 1. Alternatively, the default values may form a rough approximate for an inverse illumination profile. It is to be noted that upon correcting the raw pixel array, the pixel values of the raw pixel array are pixelwise multiplied by the digital gain coefficients together forming an inverse illumination profile estimate 33. In other words, a first raw pixel value is multiplied by its corresponding digital gain coefficient, then a second raw pixel value is multiplied by its corresponding digital gain coefficient, etc.

In step 107, an analog processing operation is optionally applied to the raw pixel values and/or to the corrected pixel values to improve the ability to match and track the movement of common features present in both current and previously collected image frames. In step 109, the corrected and optionally processed image data is digitized with the ADC 17 to obtain digital pixel values forming digital image data, i.e., the corrected digital image 31. The ADC 17 is in this example at most a 5-bit ADC. In other words, 5 bits at most are used to code any given value. In step 111, the digital gain coefficients are updated so that a respective gain coefficient corresponding to a respective digital pixel value is incremented if the respective digital pixel value is below or equal to a given pixel threshold value, and so that the respective gain coefficient corresponding to the respective digital pixel value is decremented if the respective digital pixel value is above or equal to the given pixel threshold value. It is to be noted that the increase or decrement is understood to also include the value of 0. In other words, the range of possible values covers all the real numbers that are greater than or equal to zero. The given pixel threshold value may for example be an average pixel value of the raw image pixel values calculated over one or more image frames. Advantageously, the digital gain coefficients are incremented or decremented by at most 300 mV in a given update, or more specifically by at most 200 mV, 100 mV, or 50 mV to preserve stability of the iteration process. Furthermore, ideally the digital gain coefficients are updated only while the mouse is moving.

In step 113, the digital image data is compared to previous image frames and more specifically to their digital image data stored in memory to calculate a displacement between different image frames. In step 115, the calculated displacement is used to formulate a host report to be sent to a host computer. In step 117, the digital image data is stored in memory for use in future frame comparisons. In step 119, a new flash is scheduled, and the method continues in step 101. It is to be noted that step 111 may selectively be carried out only for given frames. During the negative feedback loop, an inverted illumination profile estimate is built to apply as gain in the analog gain stage.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of applying an illumination correction for an optical computer mouse, the method comprising the steps of:

flashing a light source of the optical computer mouse directed towards a surface;

accumulating voltage on a pixel array of the optical computer mouse to obtain raw pixel values of an image frame in response to detecting light reflected from the surface;

applying analog correction to the raw pixel values based on digital gain coefficients to obtain an array of corrected pixel values forming corrected image data;

digitizing the corrected image data with an analog-to-digital converter to obtain digital pixel values forming digital image data; and updating the digital gain coefficients so that a respective gain coefficient corresponding to a respective digital pixel value is incremented if the respective digital pixel value is below or equal to a given pixel threshold value, and so that the respective gain coefficient corresponding to the respective digital pixel value is decremented if the respective digital pixel value is above the given pixel threshold value.

2. The method according to claim 1, wherein the amount of increment and/or decrement scales with the magnitude of the respective digital pixel value.

3. The method according to claim 1, wherein the method further comprises comparing the digital image data to previous image frames stored in memory to calculate a displacement between image frames.

4. The method according to claim 3, wherein the calculated displacement is used in formulating a host report to be sent to a host computer.

5. The method according to claim 1, wherein the method further comprises storing the digital image data in memory for use in future frame comparisons.

6. The method according to claim 1, wherein the given pixel threshold value is an average pixel value of the raw pixel values calculated over one or more image frames.

7. The method according to claim 1, wherein the digital gain coefficients are updated iteratively for selected image frames as soon as the digital pixel values have been obtained for a given image frame.

8. The method according to claim 1, wherein the digital gain coefficients are incremented or decremented by at most 200 mV in a given update.

9. The method according to claim 1, wherein the digital gain coefficients are updated only for image frames which have been displaced with respect to their immediately previous image frame.

10. The method according to claim 1, wherein the digital gain coefficients are used to pixelwise multiply the raw pixel values to obtain the array of corrected pixel values.

11. The method according to claim 1, wherein the analog-to-digital converter is at most a 5-bit analog-to-digital converter.

12. The method according to claim 1, wherein the digital gain coefficients are iteratively updated over a plurality of image frames to build an inverted illumination profile estimate for the optical computer mouse.

13. An optical computer mouse comprising means for:

flashing a light source of the optical computer mouse directed towards a surface;

accumulating voltage on a pixel array of the optical computer mouse to obtain raw pixel values of an image frame in response to detecting light reflected from the surface;

applying analog correction to the raw pixel values based on digital gain coefficients to obtain an array of corrected pixel values forming corrected image data;

digitizing the corrected image data with an analog-to-digital converter to obtain digital pixel values forming digital image data; and updating the digital gain coefficients so that a respective gain coefficient corresponding to a respective digital pixel value is incremented if the respective digital pixel value is below or equal to a given pixel threshold value, and so that the respective gain coefficient corresponding to the respective digital pixel value is decremented if the respective digital pixel value is above the given pixel threshold value.

* * * * *